(12) United States Patent
Patil et al.

(10) Patent No.: US 9,000,913 B2
(45) Date of Patent: Apr. 7, 2015

(54) WEARABLE LOW PRESSURE WARNING DEVICE WITH AUDIO AND VISUAL INDICATION

(71) Applicant: Honeywell International Inc., Morristown, NJ (US)

(72) Inventors: Swapnil Gopal Patil, Maharashtra (IN); Garaga Phani Kumar, Andhra Pradesh (IN); Swan Tuffery, Bouillargues (FR)

(73) Assignee: Honeywell International Inc., Morristown, NJ (US)

( * ) Notice: Subject to any disclaimer, the term of this patent is extended or adjusted under 35 U.S.C. 154(b) by 105 days.

(21) Appl. No.: 13/732,568

(22) Filed: Jan. 2, 2013

(65) Prior Publication Data
US 2014/0184407 A1 Jul. 3, 2014

(51) Int. Cl.
| | | |
|---|---|---|
| A62B 9/00 | (2006.01) | |
| A62B 7/00 | (2006.01) | |
| A62B 17/04 | (2006.01) | |
| A62B 18/00 | (2006.01) | |
| A62B 18/02 | (2006.01) | |
| A62B 18/04 | (2006.01) | |
| A62B 18/08 | (2006.01) | |
| G08B 21/18 | (2006.01) | |
| A62B 17/00 | (2006.01) | |
| G08B 21/02 | (2006.01) | |

(52) U.S. Cl.
CPC .............. *G08B 21/182* (2013.01); *A62B 17/00* (2013.01); *G08B 21/02* (2013.01)

(58) Field of Classification Search
None
See application file for complete search history.

(56) References Cited

U.S. PATENT DOCUMENTS

| | | | |
|---|---|---|---|
| 3,776,174 A | 12/1973 | Kunoth | |
| 4,067,376 A | 1/1978 | Barabino | |
| 4,100,537 A | 7/1978 | Carlson | |
| 4,174,673 A | 11/1979 | Tung et al. | |
| 4,286,253 A | 8/1981 | Nagy | |
| 4,707,953 A | 11/1987 | Anderson et al. | |
| 4,800,373 A | 1/1989 | Mayz | |
| 5,365,923 A | 11/1994 | Lundberg | |
| 5,652,966 A * | 8/1997 | Reinert, Sr. ....................... 2/457 |
| 6,310,552 B1 | 10/2001 | Stumberg et al. | |
| 7,342,502 B2 * | 3/2008 | Harkins et al. ............. 340/573.1 |
| 7,690,379 B2 * | 4/2010 | Gossweiler ............... 128/205.23 |
| 2003/0112136 A1 | 6/2003 | Reidhead | |
| 2004/0255685 A1 | 12/2004 | Pekar et al. | |
| 2006/0213517 A1 * | 9/2006 | Mashak .................... 128/204.21 |
| 2007/0215148 A1 | 9/2007 | Tuffery | |
| 2010/0218305 A1 * | 9/2010 | Weston et al. ..................... 2/457 |

FOREIGN PATENT DOCUMENTS

| | | |
|---|---|---|
| WO | 2005118072 A1 | 12/2005 |
| WO | 2011143485 A2 | 11/2011 |

* cited by examiner

*Primary Examiner* — Julie Lieu
(74) *Attorney, Agent, or Firm* — Conley Rose, P.C.; Kristin Jordan Harkins

(57) ABSTRACT

Embodiments relate generally to low pressure warning devices which may be worn with encapsulated protective suits and hoods by a user and may provide audio and visual alerts. In an embodiment, a low pressure warning device may comprise an earpiece operable to be retained to the ear of a user, wherein the earpiece may comprise a control system operable to sense the pressure inside the encapsulated protective suit or hood and activate the audio and/or visual alerts when necessary. In an embodiment, the low pressure warning device may be equipped with short range wireless communication capabilities.

20 Claims, 5 Drawing Sheets

WEARABLE LOW PRESSURE WARNING DEVICE WITH AUDIO AND VISUAL INDICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Encapsulated protective suits and hoods may be worn in contaminated areas to protect the wearer of the suit or hood. For example, workers may wear an encapsulated protective suit or hood while working inside of a nuclear powered electrical generating plant or in the presence of radioactive materials. An encapsulated protective suit or hood may be a one-time use type of system, wherein the suit or hood is disposed of after a single use. An encapsulated protective suit or hood may receive breathing air during normal operating conditions via an external air flow hose connected to the suit or hood. It may be desirable to maintain a positive pressure differential between the inside of the suit or hood and the outside of the suit or hood. The positive pressure differential may reduce the chance of material, such as radioactive particles or other hazardous material, from entering the protective suit or hood. Additionally, the positive pressure differential may promote proper inflation of the suit or hood.

SUMMARY

Aspects of the disclosure may include embodiments of a low pressure warning device used with an encapsulated protective suit or hood comprising one or more of the following: a pressure sensor; an alert system; and a processor in communication with the pressure sensor and the alert system, wherein the elements listed above may be encased in an earpiece operable to attach to a user's ear; the processor may initiate the alert system when the pressure sensor indicates a pressure lower than a predetermined minimum value, the predetermined minimum value may be chosen to ensure that the pressure inside the encapsulated protective suit or hood is greater than the pressure outside the encapsulated suit or hood; and the processor may be operable to communicate with a monitoring station via a wireless connection. In an embodiment, the alert system may comprise an audio alert, wherein the audio alert may comprise at least one of: a speaker, a buzzer, or a vibrator. In an embodiment, the alert system may comprise a visual alert, wherein the visual alert may comprise a bi-color LED wherein one color may indicate a pressure lower than the predetermined minimum value and the other color may indicate a pressure higher than the predetermined minimum value. In an embodiment, the pressure sensor may be an absolute pressure sensor. In an embodiment, the device may further comprise a switch that signals for the pressure sensor to begin sensing the pressure. In an embodiment, the device may further comprise a battery operable to power the components of the device and may further comprise a charging socket connected with the battery and operable to allow for charging of the battery, wherein the battery may be rechargeable battery. In an embodiment, the predetermined minimum pressure value may be communicated to the processor via the wireless connection.

Additional aspects of the disclosure may include embodiments of an earpiece worn with an encapsulated protective suit or hood comprising one or more of the following: a casing; a battery located within the casing; a pressure sensor located within the casing and powered by the battery; an alert system located within the casing and powered by the battery; and a processor in communication with the pressure sensor and the alert system, wherein the processor may initiate the alert system when the pressure sensor indicates a pressure lower than a predetermined minimum value, wherein the predetermined minimum value may be greater than the pressure of the environment outside the encapsulated protective suit or hood. In an embodiment, the casing may comprise an outer case, an inner case, and a retaining piece, wherein the retaining piece attaches the earpiece to a user's ear. In an embodiment, the alert system may comprise an audio alert and a visual alert. In an embodiment, the audio alert may comprise at least one of: a speaker, a buzzer, or a vibrator. In an embodiment, the visual alert may comprise a bi-color LED wherein one color indicates a pressure lower than the predetermined minimum value and the other color indicates a pressure higher than the predetermined minimum value. In an embodiment, the earpiece may further comprise a switch that signals for the pressure sensor to begin sensing the pressure. In an embodiment, the earpiece may further comprise a radio transceiver operable to allow wireless communication between the processor and a monitoring station, wherein the predetermined minimum pressure value may be communicated to the processor via the wireless communication with the monitoring station.

Other aspects of the disclosure may include embodiments of a method of using a low pressure warning device worn with an encapsulated protective suit or hood comprising one or more of the following: setting a minimum pressure limit of the low pressure warning device, wherein the minimum pressure limit may be greater than the pressure of the environment outside the encapsulated protective suit or hood; activating a pressure sensor of the low pressure warning device, sensing the pressure of the environment inside the encapsulated protective suit or hood by the low pressure warning device: comparing the sensed pressure by the low pressure warning device with the minimum pressure limit; and activating an alert system if the sensed pressure by the low pressure warning device is below the minimum pressure limit, wherein the low pressure warning device may be a wearable device. In an embodiment, the step of sensing the pressure of the environment proximate to the low pressure warning device may be repeated in an on-going fashion. In an embodiment, activating the alert system may comprise activating at least one of: a buzzer, a speaker, or a vibrator. In an embodiment, activating the alert system may comprise activating a red LED. In an embodiment, if the sensed pressure is higher than the minimum pressure limit, the alert system may be deactivated. In an embodiment, deactivating the alert system may comprise deactivating at least one of: a buzzer, a speaker or a vibrator, and may comprise activating a green LED.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
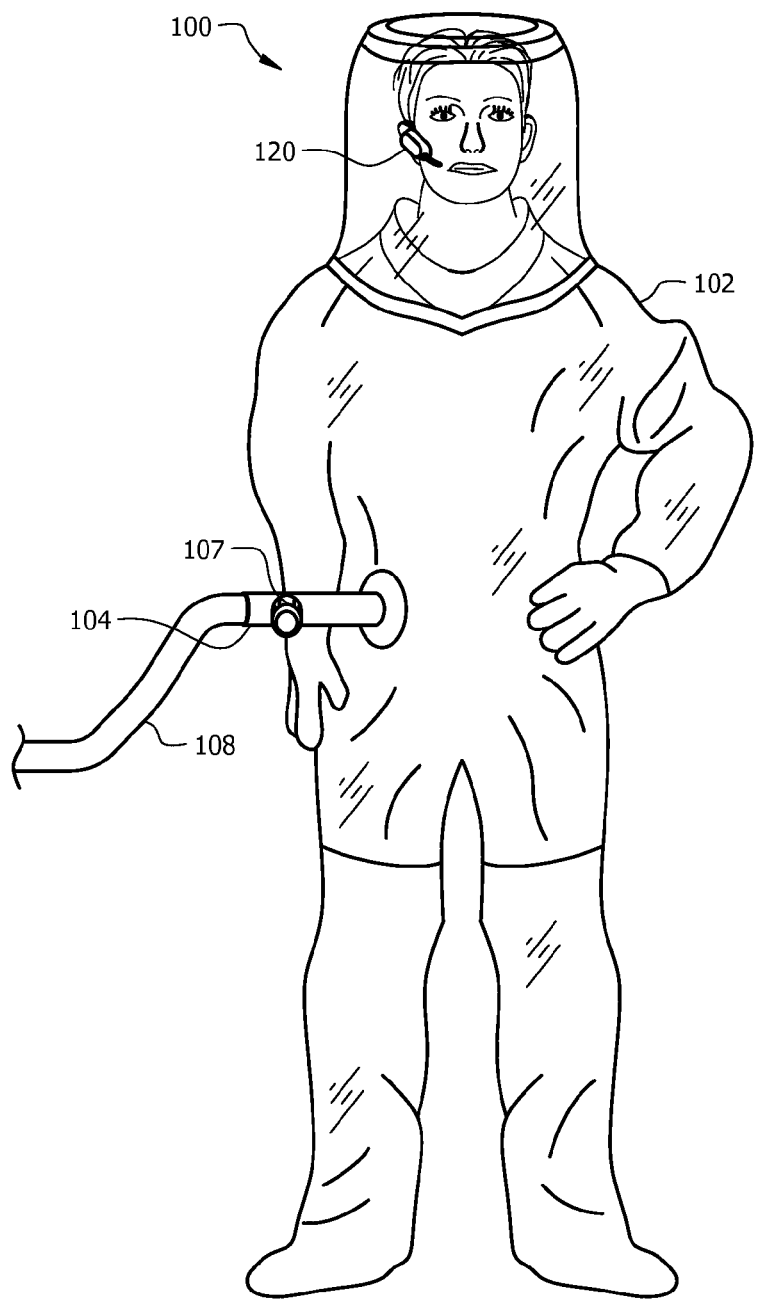
FIG. 1 illustrates an encapsulated protective suit according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments relate generally to pressure sensing devices with a low (and/or high) pressure alert system. In an embodiment, these devices may be known as low pressure warning devices (or LPWDs). A low pressure warning device may measure the pressure of an environment (e.g. a first environment) and may compare that pressure, for example, to a minimum value and/or the pressure of a second environment. An alert system may be activated if the pressure of the first environment is lower than the minimum value and/or the pressure of the second environment. The alert system may comprise an audio alert and/or a visual alert, wherein the audio alert may comprise a speaker, a buzzer, and/or a vibrator, and the visual alert may comprise a light (such as an LED) which may comprise more than one color, for example. A low pressure warning device may for example be used with a protective suit or hood wherein a positive pressure (or over pressure) with respect to the pressure outside the suit or hood may be desired. In this embodiment, the low pressure warning device may alert a user when unsafe conditions may be present. In an embodiment, the low pressure warning device may be worn separately from the suit or hood, wherein the low pressure warning device may be reusable. The low pressure warning device may be considered a piece of personal equipment, wherein a single user may use a single low pressure warning device (possibly repeatedly) and the device may not be shared between users. Additionally, the low pressure warning device may be reconfigurable for use in different environments associate with different pressure warning thresholds. In an embodiment, a low pressure warning device may be desired in other applications as well, and may be operable to sense and/or monitor the pressure of any proximate environment.

Turning now to FIG. 1, an encapsulated protective suit 100 is described. In an embodiment, the protective suit 100 may comprise a skin 102 and a breathable air receptacle 104. The breathable air receptacle 104 may comprise a flow control valve 107. When in use, a breathable air supply line 108 may be coupled to the breathable air receptacle 104 to provide breathable air and inflating pressure to the suit 100. In some contexts the breathable air receptacle 104 may be referred to as a breathable air inlet. In an embodiment, the suit 100 may be a single use suit that is disposed of after one use. It may be desirable to dispose of the suit 100 after a single use rather than risk the suit contaminating clear areas, as may be the case if the exterior of the suit is exposed to hazardous materials such as radioactive particles. In manufacturing a single use suit 100, it may be desirable to reduce the cost of the suit 100 by using relatively inexpensive components in manufacturing the suit. In another embodiment, however, the suit 100 may be used a plurality of times.

A user may don or put on the suit 100 and may further don or put on booties, shoes, or boots on the feet to protect the integrity of the feet of the suit 100 and gloves to seal the suit 100 at the hands. The suit 100 may be a fully encapsulated protective suit. Air for breathing under normal operating conditions may be provided by the breathable air supply line 108, for example an air hose coupled to a powered air purifying respirator device (not shown), and air within the suit 100 is breathed by the user. The air flow may provide additional functions, for example inflating the suit 100 and/or cooling the occupant of the suit 100. In an embodiment, an exhaust valve (not shown) coupled to the suit 100 allows air to leave the suit. The suit 100 may be used in any contaminated environment, for example a workplace having radioactive materials and/or a nuclear powered electrical power generation facility. The suit 100 may be used as well in other contaminated environments. It is understood that in different embodiments the suit 100 may take different forms from that illustrated in FIG. 1.

While using the suit 100 in the contaminated environment, it may be preferred that a positive pressure differential be maintained between the interior and exterior of the suit 100. This positive pressure differential may provide a margin of safety. If a minor breach of the skin 102 occurs, contaminated material is not likely to enter the suit 100 but rather may be discouraged from entry by air flowing from the interior to the exterior of the suit 100 at the location of the minor breach. Additionally, the positive pressure differential promotes inflating the suit 100. A user may wear a low pressure warning device 120, operable to sense the pressure within the suit 100. In an embodiment, the low pressure warning device 120 may be suspended from the ear by a loop or wire that passes over the ear of a user. In another embodiment, the low pressure warning device 120 may be carried by a head piece that passes over the top of the head of the user. In yet another embodiment, the low pressure warning device 120 may be suspended from the neck of the user or may clip to a shirt collar or a shirt closure worn by the user. It will be appreciated that the present disclosure contemplates that the low pressure warning device 120 may be carried in other ways by the user. When the low pressure warning device 120 indicates a low differential pressure operating condition of the suit 100, the user of the suit may adjust the flow of the air supply from the line 108 by turning or otherwise adjusting the flow control valve 107. Generally it is desired that the suit 100 be relatively air-tight, with the possible exception of the exhaust valve described above, to promote efficiency.

Figure 2:
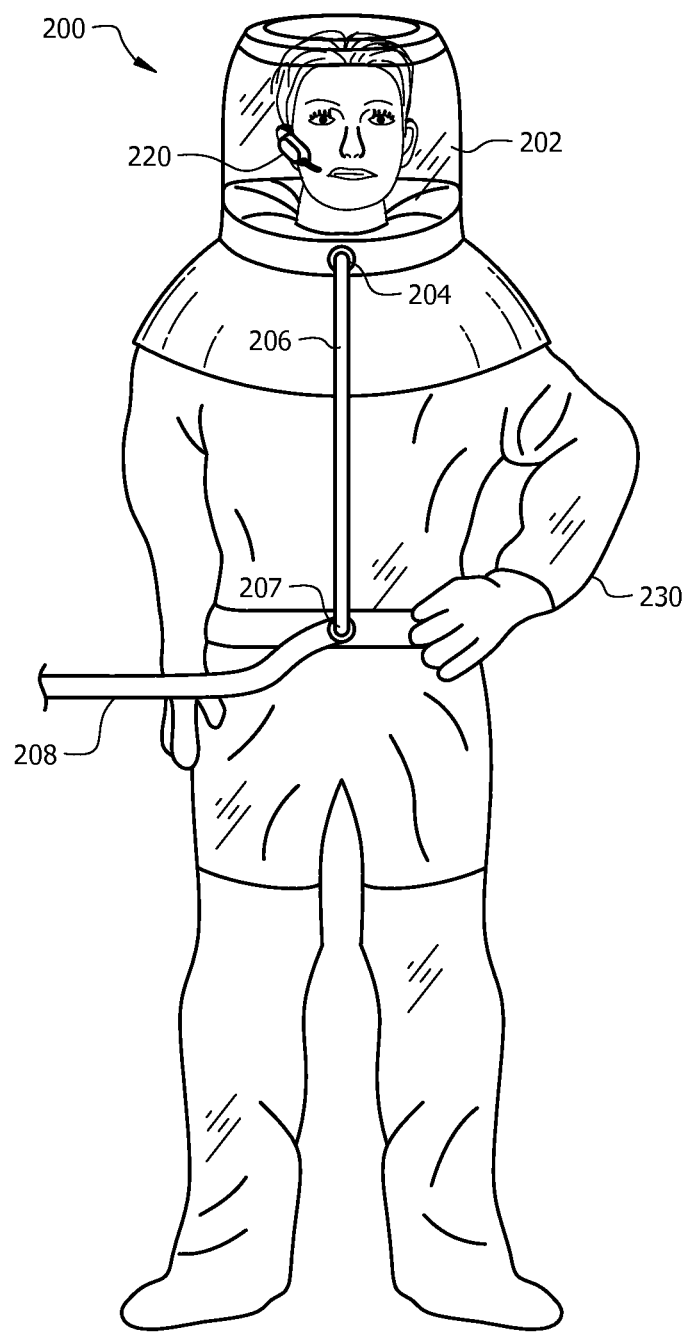
FIG. 2 illustrates an encapsulated protective hood according to an embodiment of the disclosure.

Turning now to FIG. 2, an encapsulated protective hood 200 is described, wherein the hood 200 may function in a similar fashion to the suit 100 described above. In an embodiment, the protective hood 200 may comprise a skin 202 and a breathable air receptacle 204. The breathable air receptacle 104 may connect to a flow control valve 107. When in use, a breathable air supply line 208 may be coupled to the flow control valve 107, which may connect to an additional supply line 206 coupled to the breathable air receptacle 104 to provide breathable air and inflating pressure to the hood 200. In some contexts the breathable air receptacle 204 may be referred to as a breathable air inlet. In an embodiment, the hood 200 may be a single use hood that is disposed of after one use. It may be desirable to dispose of the hood 200 after a single use rather than risk the hood contaminating clear areas, as may be the case if the exterior of the hood is exposed to hazardous materials such as radioactive particles. In manufacturing a single use hood 200, it may be desirable to reduce the cost of the hood 200 by using relatively inexpensive components in manufacturing the suit. In another embodiment, however, the hood 200 may be used a plurality of times.

In an embodiment, the hood 200 may be worn with a protective suit 230. The user dons or puts on the hood 200 and suit 230 and may further don or put on booties, shoes, or boots on the feet to protect the integrity of the feet of the suit 230 and gloves to seal the suit 230 at the hands. The suit 230 may be a fully encapsulated protective suit and the hood 200 may be a fully encapsulated protective hood. Air for breathing under normal operating conditions may be provided by the breathable air supply line 208 and 206, for example an air hose coupled to a powered air purifying respirator device (not shown), and air within the hood 200 is breathed by the user. The air flow may provide additional functions, for example inflating the hood 200 and/or cooling the occupant of the hood 200 and suit 230. In an embodiment, an exhaust valve (not shown) coupled to the hood 200 allows air to leave the suit. The hood 200 may be used in any contaminated environment, for example a workplace having radioactive materials and/or a nuclear powered electrical power generation facility. The hood 200 may be used as well in other contaminated environments. It is understood that in different embodiments the hood 200 may take different forms from that illustrated in FIG. 2.

As with the suit 100 of FIG. 1, while using the hood 200 in the contaminated environment, it may be preferred that a positive pressure differential be maintained between the interior and exterior of the hood 200. This positive pressure differential may provide a margin of safety. If a minor breach of the skin 202 occurs, contaminated material is not likely to enter the hood 200 but rather may be discouraged from entry by air flowing from the interior to the exterior of the hood 200 at the location of the minor breach. Additionally, the positive pressure differential promotes inflating the hood 200. A user may wear a low pressure warning device 220, operable to sense the pressure within the hood 200. When the low pressure wanting device 220 indicates a low differential pressure operating condition of the hood 200, the user of the suit may adjust the flow of the air supply from the lines 208 and 206 by turning or otherwise adjusting the flow control valve 207. Generally it is desired that the hood 200 be relatively air-tight, with the possible exception of the exhaust valve described above, to promote efficiency. In an embodiment, the low pressure warning device 220 may be substantially similar to the low pressure warning device 120 described above in FIG. 1.

For a given suit 100 or hood 200 (as described above in FIGS. 1 and 2) and a given environment in which the suit 100 is to be used, a given pressure level or pressure differential may be preferred. For different suits 100 (or hoods 200) and/or different environments, a different pressure or pressure differential may be preferred. For example, in a first suit 100 used in a first environment, a pressure of X PSI may be preferred while for a second suit 100 used in the first environment, a pressure of Y PSI may be preferred, where X does not equal Y. As another example, in a first suit 100 used in a first environment, a pressure of X PSI may be preferred while for the first suit 100 used in a second environment, a pressure of Z. PSI may be preferred, where X does not equal Z. A manufacturer of encapsulated protective suits 100 may need to stock a plurality of different low pressure warning devices that conform to the prior art (i.e., low pressure warning devices that are not adjustable after assembly) that are calibrated for indicating different low pressure warning thresholds for use in different suits 100 and/or for use in different environments. Maintaining adequate stock of each of the differently calibrated low pressure warning devices that conform to the prior art may entail significant inventory costs for the manufacturer of the suits 100 and/or hoods 200. Additionally, the opportunity for assembling the suit 100 and/or hood 200 using the wrong prior art non-adjustable warning device may be considered a disadvantage. The present disclosure teaches a low pressure warning device 120 that has an adjustable indication threshold. Thus, the same low pressure warning device 120 (or 220) may be adjusted to indicate a low pressure or pressure differential condition at different thresholds.

Figure 3A:
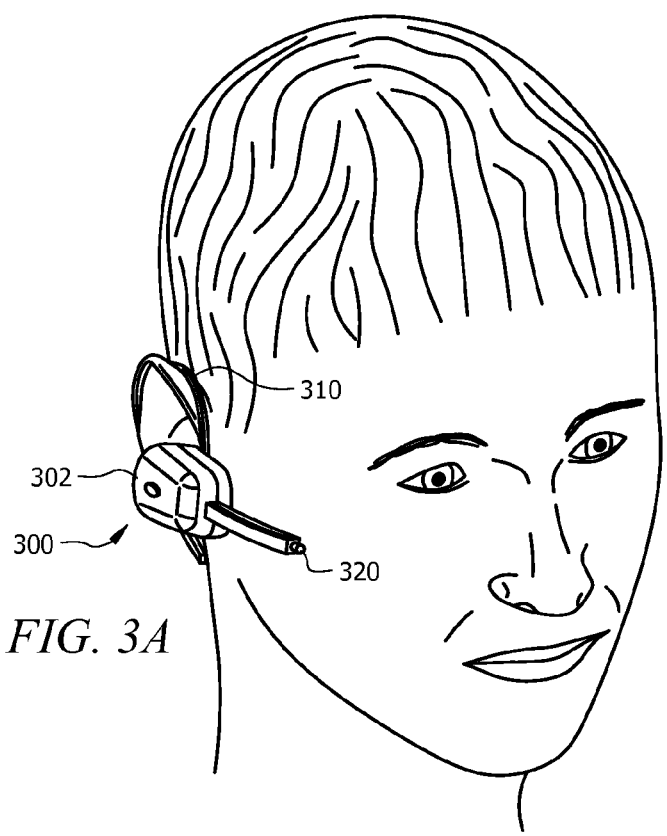
FIG. 3A illustrates a low pressure warning device according to an embodiment of the disclosure.
Figure 3B:
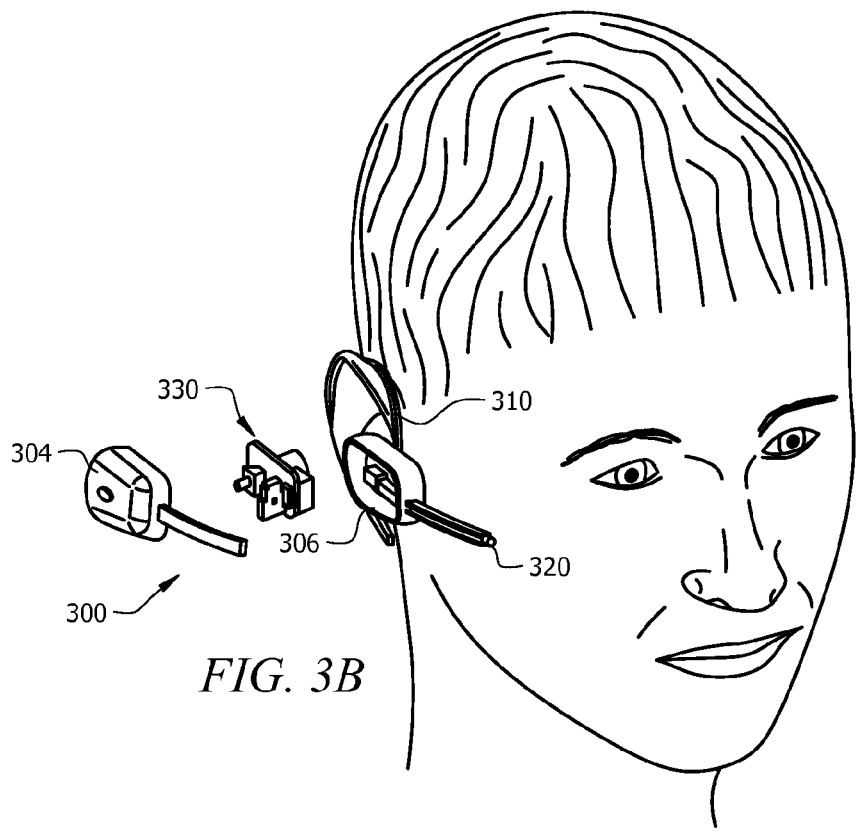
FIG. 3B illustrates a partially exploded view of a low pressure warning device according to an embodiment of the disclosure.
Figure 3C:
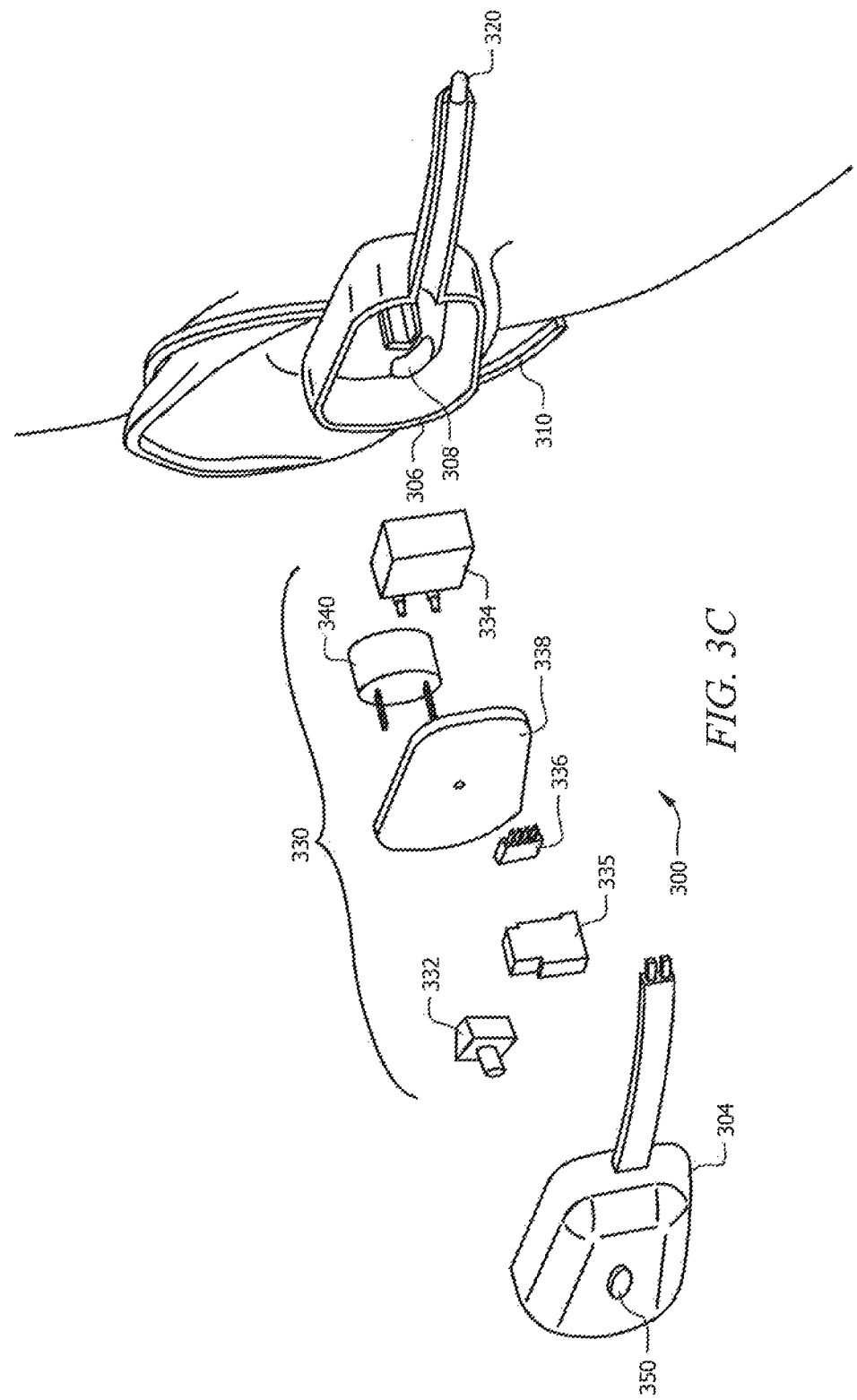
FIG. 3C illustrates an exploded view of a low pressure warning device according to an embodiment of the disclosure.

FIGS. 3A-3C illustrate embodiments of a low pressure warning device that may be worn with a suit and/or hood as described above in FIGS. 1 and 2. In an embodiment, the low pressure warning device may comprise the form of an earpiece 300, and may be operable to attach (or be retained) to a user's ear. In an embodiment, the low pressure warning device may be carried or worn in another way by the user. In an embodiment, the earpiece 300 may comprise a retaining piece 310, wherein the retaining piece 310 may be operable to retain and/or attach the earpiece 300 to the user's ear. The earpiece 300 may also comprise a casing 302 which may enclose a control system 330 and an alert system therein and may connect to the retaining piece 310. In an embodiment, the alert system may comprise an audible alert 340 and a visual alert 320. FIG. 3B shows an embodiment of the earpiece 300 in a partially exploded view. In an embodiment, the casing 302 may comprise an outer casing 304 and an inner casing 306, wherein the control system 330 may be located between the outer 304 and inner 306 casing. The control system 330 may comprise components operable to sense the pressure of the environment proximate to the earpiece 300 and activate the alert system (visual and/or audio) if the sensed pressure is lower than a predetermined (or predefined) minimum value.

FIG. 3C shows an exploded view of an embodiment of the earpiece 300, wherein the control system 330 may comprise a pressure sensor 332, a battery 334 (optionally connected to a charging socket 335), a processor 336, a PCB (printed circuit board) 338, and an audio alert 340. The audio alert 340 may in some embodiments comprise a buzzer, a speaker, and/or a vibrator. In an embodiment, the audio alert 340 may be controlled by the processor 336. Additionally, the visual alert 320 may be controlled by the processor 336. In an embodiment, the processor 336 may be one or more of a microcontroller, a microprocessor, a digital signal processor (DSP), a programmable logic device (PLD), a field programmable logic device (FPLD), an application specific integrated circuit (ASIC), or the like. In an embodiment, the processor 336 may activate the visual alert 320 and/or the audio alert 340 if the pressure sensor 332 senses or detects a pressure lower than a predefined minimum value (wherein the minimum value may be communicated to the processor 336, for example). In an embodiment, the inner case 306 may comprise an opening 308 operable to allow sound/vibration from the audio alert 340 to reach a user's ear. Additionally, the inner case 306 may comprise an in-ear portion operable to fit within a user's ear, wherein the audio alert 340 may be communicated to the user via the in-ear portion. In an embodiment, the PCB 338 may provide communication between the components of the earpiece 300, wherein the audio alert 340, battery 334, processor 336, and pressure sensor 332 may connect to the PCB 338.

In an embodiment, the outer case 304 may comprise a switch (or button) 350 operable to activate the pressure sensor 332 when pressed by a user. The switch 350 may signal the pressure sensor 332 to begin sensing the pressure of the environment proximate to the earpiece 300. In an embodiment, the pressure sensor 332 may comprise an absolute pressure sensor (wherein the pressure sensor may be operable to sense absolute pressure). In an embodiment, the processor 336 may control the interaction between the switch 350 and the pressure sensor 332. In an embodiment, the pressure sensor 332 may be activated by the processor 336. The pressure sensor 332 may, in some embodiments, monitor/sense the pressure of the environment proximate to the earpiece 300 continuously and/or repeatedly, wherein the sensed pressure value may be continuously and/or repeatedly communicated to the processor 336. The processor 336 (and/or the pressure sensor 332) may compare the pressure sensed by the pressure sensor 332 with a predetermined (or predefined) minimum pressure value, wherein if the sensed pressure is lower than the predefined minimum value, the alert system (comprising the audio alert 340 and visual alert 320) may be activated. In an embodiment, when the alert system is activated, the audio alert 340 may sound and/or vibrate (wherein a user may hear and/or feel the audio alert) and the visual alert 320 may produce a light (which may for example be a red light). In an embodiment, when the alert system is deactivated, the audio alert 340 may not sound, and the visual alert 320 may produce a light of a different color (which may for example be a green light). In an embodiment, the light may comprise a bi-color LED, and may in some embodiments comprise one or more flashing LEDs.

In an embodiment, the low pressure warning device (or earpiece 300) may additionally comprise a wireless communication capability, which may for example be provided by a short range radio transceiver (which may communicate using Bluetooth, for example). In an embodiment, the processor 336 may house the short range radio transceiver, while in other embodiments, the short range radio transceiver may be located on the PCB 338. In an embodiment, the short range radio transceiver may be operable to communicate information between the earpiece 300 and an external computer system. For example, in an embodiment, the minimum pressure value may be communicated to the earpiece 300 from a control station as a part of a configuration or initialization process. Additionally, the pressure sensor 332 may be activated and/or deactivated by the processor 336 as indicated by a communication via the wireless connection. In an embodiment, the earpiece 300 may communicate pressure information gathered by the pressure sensor 332 to a monitoring station via the short range radio transceiver. For example, one or more logs of sensed pressure may be stored during use of the low pressure warning device (earpiece 300) and transmitted at the end of a work shift to the monitoring station. Logs of sensed pressure may also be transmitted to the monitoring station on an on-going basis. Additionally, low pressure alarming events may be logged and transmitted to the monitoring station.

The pressure information and/or alarm information may be documented and could be used when compiling safety reports, for example, and may also be used when evaluating the safety of a particular environment and/or suit worn in the environment. Additionally, the audio alert 340 may optionally be in communication with the short range radio transceiver, wherein the radio transceiver may be operable to wirelessly communicate audio (such as a prerecorded message and/or live communication) to the user via the audio alert 340. In an embodiment, the short range radio transceiver may wirelessly communicate with a station within the hazardous environment where a suit or hood may be worn, wherein the station may then communicate with a base station (via a wired connection) wherein the base station may, for example, be located in a safe area outside of the hazardous environment.

In an embodiment, the earpiece 300 may comprise a charging socket 335 operable to receive a cord (or other means of charging) and allow for charging of the battery 334, wherein the battery 334 may be a rechargeable battery. In an embodiment, the charging socket 335 may be accessible for a charging cord when the earpiece 300 is assembled, wherein for example, a portion of the charging socket 335 may extend from the earpiece 300 and/or the earpiece 300 may comprise an opening to allow access to the charging socket 335.

Figure 4:
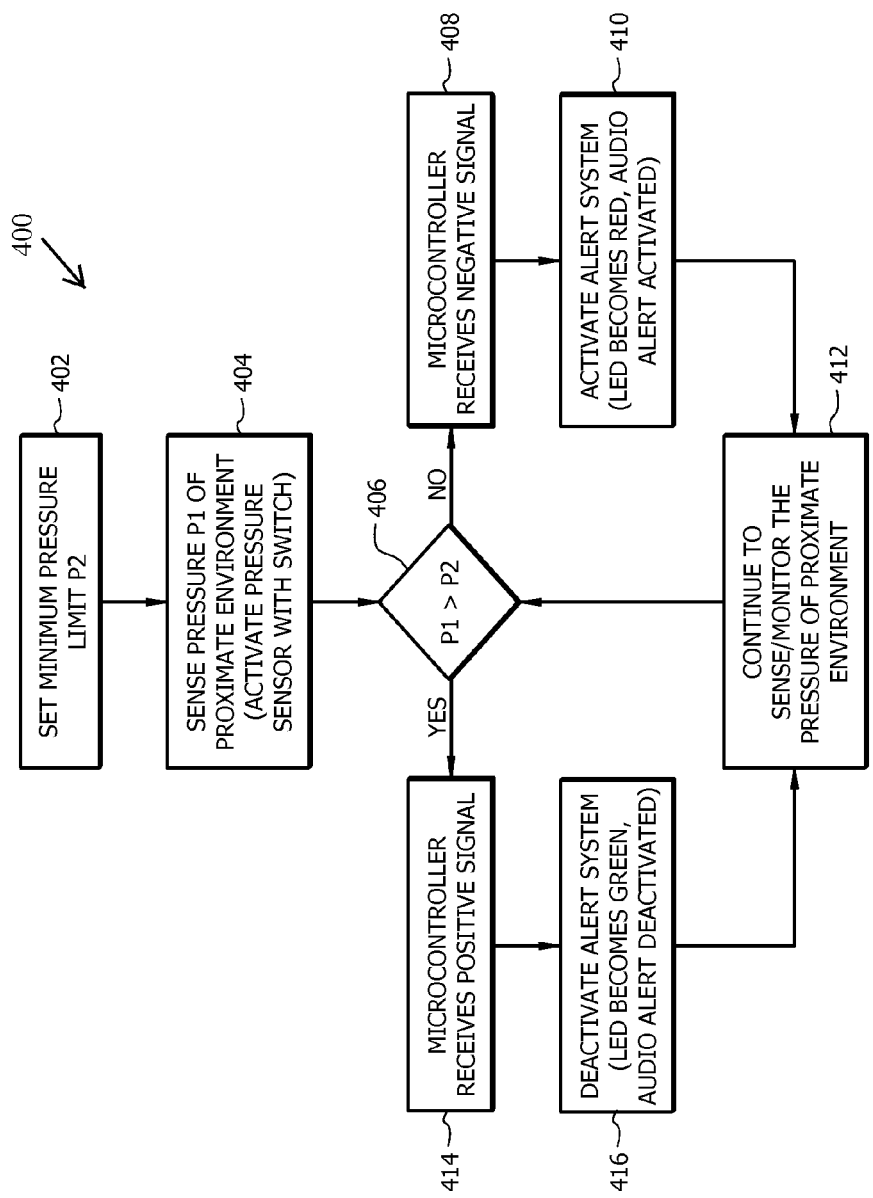
FIG. 4 illustrates a flow chart of a process for using a low pressure warning device.

Other embodiments of the disclosure may include methods of using and/or operating a low pressure warning device. As shown in FIG. 4, a method 400 may comprise setting a minimum pressure limit P2 and communicating this limit to the low pressure warning device, at block 402. The method may then comprise sensing the pressure P1 of the environment proximate to the low pressure warning device (which may be accomplished by activating a pressure sensor at block 404). A step, shown at block 406, may then comprise comparing the sensed pressure P1 with the minimum pressure limit P2. If the sensed pressure P1 is lower (or not greater than) than the minimum pressure limit P2, a step may comprise activating an alert system, wherein the alert system may comprise a visual alert and/or an audio alert. A step may also include transmitting alert information via a short range radio transceiver to the monitoring station. If the sensed pressure P1 is higher (or greater) than the minimum pressure limit P2, the alert system may not be activated (or may be deactivated). In an embodiment, when the alert system is not activated, the audio alert may not sound and the visual alert may change color and/or not display.

In an alternative embodiment the alert system may be operable to convey multiple alerts to a user. For example, the alert system may comprise a bi-color LED, wherein a first color indicates that the sensed pressure P1 is lower (or not greater than) than the minimum pressure limit P2 and a second color indicates that the sensed pressure P1 is higher (or greater) than the minimum pressure limit P2. In an embodiment, a negative signal may be sent to the processor from the pressure sensor at block 408 if the sensed pressure P1 is not greater than the minimum pressure limit P2. The processor may then activate the alert system at block 410 such that the audio alert may be activated and the LED may show red. The pressure sensor may continue to sense/monitor the pressure (at block 412) and the steps of blocks 406, 408, 410, 414, and 416 may be repeated. In another embodiment, if the sensed pressure P1 is greater than the minimum pressure limit P2, a positive signal may be sent to the processor from the pressure sensor at block 414. The processor may then activate (or deactivate) the alert system at block 416 such that the audio alert may be deactivated and the LED may show green. Again, the pressure sensor may continue to sense/monitor the pressure (at block 412) and the steps of blocks 406, 408, 410, 414, and 416 may be repeated. In an embodiment, the method 400 may continue repeating as shown in FIG. 4 until the low pressure warning device is deactivated by a user, which may for example be achieved by pressing a switch on the device.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiments) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiments) of the present inventions). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the inventions) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A low pressure warning device used with an encapsulated protective suit or hood comprising:
   a pressure sensor;
   an alert system; and
   a processor in communication with the pressure sensor and the alert system,
   wherein:
   the elements listed above are encased in an earpiece operable to attach to a user's ear,
   the processor initiates the alert system when the pressure sensor indicates a pressure lower than a predetermined minimum value,
   the predetermined minimum value is chosen to ensure that the pressure inside the encapsulated protective suit or hood is greater than the pressure outside the encapsulated suit or hood,
   the processor is operable to communicate with a monitoring station via a wireless connection; and
   the pressure sensor is separate from the protective hood.

2. The device of claim 1 wherein the alert system comprises an audio alert, and wherein the audio alert comprises at least one of: a speaker, a buzzer, or a vibrator.

3. The device of claim 1 wherein the alert system comprises a visual alert, and wherein the visual alert comprises a bi-color LED wherein one color indicates a pressure lower than the predetermined minimum value and the other color indicates a pressure higher than the predetermined minimum value.

4. The device of claim 1 wherein the pressure sensor is an absolute pressure sensor.

5. The device of claim 1 further comprising a switch that signals for the pressure sensor to begin sensing the pressure.

6. The device of claim 1 wherein the low pressure warning device is reconfigurable so as to associate the alert system with an adjustable indication threshold.

7. The device of claim 1 wherein the predetermined minimum pressure value is communicated to the processor via the wireless connection.

8. An earpiece worn with an encapsulated protective suit or hood comprising:
 a casing;
 a battery located within the casing;
 a pressure sensor located within the casing and powered by the battery;
 an alert system located within the casing and powered by the battery; and
 a processor in communication with the pressure sensor and the alert system,
 wherein the processor initiates the alert system when the pressure sensor indicates a pressure lower than a predetermined minimum value, wherein the predetermined minimum value is greater than the pressure of the environment outside the encapsulated protective suit or hood; and
 wherein the pressure sensor of the earpiece is separate from the protective suit or hood.

9. The earpiece of claim 8 wherein the casing comprises an outer case, an inner case, and a retaining piece, wherein the retaining piece is operable to attach the earpiece to a user's ear.

10. The earpiece of claim 8 wherein the alert system comprises an audio alert and a visual alert.

11. The earpiece of claim 10 wherein the audio alert comprises at least one of: a speaker, a buzzer, or a vibrator.

12. The earpiece of claim 10 wherein the visual alert comprises a bi-color LED wherein one color indicates a pressure lower than the predetermined minimum value and the other color indicates a pressure higher than the predetermined minimum value.

13. The earpiece of claim 8 further comprising a switch that signals for the pressure sensor to begin sensing the pressure.

14. The earpiece of claim 8 further comprising a radio transceiver operable to allow wireless communication between the processor and a monitoring station, wherein the predetermined minimum pressure value is communicated to the processor via the wireless communication with the monitoring station.

15. A method of using a low pressure warning device worn with an encapsulated protective suit or hood comprising:
 setting a minimum pressure limit of the low pressure warning device, wherein the minimum pressure limit is greater than the pressure of the environment outside the encapsulated protective suit or hood;
 activating a pressure sensor of the low pressure warning device;
 sensing the pressure of the environment inside the encapsulated protective suit or hood by the low pressure warning device;
 comparing the sensed pressure by the low pressure warning device with the minimum pressure limit; and
 activating an alert system if the sensed pressure by the low pressure warning device is below the minimum pressure limit, wherein the low pressure warning device is a wearable device;
 wherein the low pressure warning device is a pressure sensor encased in an earpiece and is from the protective suit or hood.

16. The method of claim 15 wherein the step of sensing the pressure of the environment proximate to the low pressure warning device is repeated in an on-going fashion.

17. The method of claim 15 wherein activating the alert system comprises activating at least one of: a buzzer, a speaker, a vibrator; or an LED.

18. The method of claim 15 further comprising retaining the low pressure warning device to the user and donning the protective suit or hood, wherein the low pressure warning device is separate from the protective suit or hood.

19. The method of claim 15 wherein, if the sensed pressure is higher than the minimum pressure limit, the alert system is deactivated.

20. The method of claim 15 further comprising adjusting the minimum pressure limit to reconfigure the low pressure warning device.

\* \* \* \* \*